US009404446B2

(12) United States Patent
Fujiwara et al.

(10) Patent No.: US 9,404,446 B2
(45) Date of Patent: Aug. 2, 2016

(54) VEHICLE FUEL VAPOR RECOVERY SYSTEM

(71) Applicant: Nissan North America, Inc., Franklin, TN (US)

(72) Inventors: Souichi Fujiwara, Novi, MI (US); Brandon Michael Dawe, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 259 days.

(21) Appl. No.: 14/096,754

(22) Filed: Dec. 4, 2013

(65) Prior Publication Data

US 2015/0152816 A1   Jun. 4, 2015

(51) Int. Cl.
| | |
|---|---|
| B62D 25/00 | (2006.01) |
| F02M 25/08 | (2006.01) |
| B60K 15/01 | (2006.01) |
| B01D 46/00 | (2006.01) |
| B01D 53/04 | (2006.01) |
| B60K 15/04 | (2006.01) |
| B60K 15/035 | (2006.01) |

(52) U.S. Cl.
CPC ......... *F02M 25/089* (2013.01); *B01D 46/0036* (2013.01); *B01D 53/0407* (2013.01); *B60K 15/013* (2013.01); *B60K 15/035* (2013.01); *B60K 15/03504* (2013.01); *B60K 15/0406* (2013.01); *F02M 25/0854* (2013.01); *B01D 2257/702* (2013.01); *B01D 2259/4516* (2013.01); *B60K 2015/03509* (2013.01); *B60K 2015/03538* (2013.01); *Y10T 137/86324* (2015.04)

(58) Field of Classification Search
CPC ............... B60K 2015/047; B60K 2015/03538; B60K 2015/0458; B60K 15/04

USPC ...................... 296/97.22; 220/86.2
See application file for complete search history.

(56) References Cited

U.S. PATENT DOCUMENTS

| | | | | |
|---|---|---|---|---|
| 4,079,952 A | * | 3/1978 | Nishio ................... | B60K 15/04 220/86.2 |
| 4,741,369 A | * | 5/1988 | Dawson ................. | B60K 15/04 141/286 |
| 4,816,045 A | * | 3/1989 | Szlaga ................... | B60K 15/04 141/286 |
| 4,887,578 A | | 12/1989 | Woodcock et al. | |
| 4,917,157 A | * | 4/1990 | Gifford ................. | B60K 15/04 123/519 |
| 5,027,868 A | | 7/1991 | Morris et al. | |
| 5,570,730 A | * | 11/1996 | Keehn, Jr. ............. | B63B 25/082 141/312 |
| 5,769,057 A | * | 6/1998 | Hashimoto .......... | B60K 15/035 123/516 |

(Continued)

OTHER PUBLICATIONS

2012 Chevrolet Volt Gas Tank Filler Tube.

*Primary Examiner* — Craig Schneider
*Assistant Examiner* — Angelisa L Hicks
(74) *Attorney, Agent, or Firm* — Global IP Counselors, LLP (57) ABSTRACT

A vehicle fuel vapor recovery system includes a compartment wall structure, a fuel filler tube and an air vent chamber structure. The compartment wall structure has a tube receiving opening and a vent opening. The fuel filler tube has a fuel receiving end located within the fuel filler compartment and a fuel tank attachment end located outside of the fuel filler compartment. The air vent chamber structure has a first wall located outside of the fuel filler compartment and a second wall extending from the first wall to an outer surface of the fuel filler tube. The first wall, the second wall, the fuel filler compartment wall structure, and the fuel filler tube cooperate to define an air vent chamber.

18 Claims, 7 Drawing Sheets

(56) References Cited

U.S. PATENT DOCUMENTS

| | | |
|---|---|---|
| 5,769,481 A | 6/1998 | Cooper |
| 6,000,426 A | 12/1999 | Tuckey et al. |
| 6,017,061 A | 1/2000 | Adachi |
| 6,065,507 A | 5/2000 | Nanaji |
| 6,260,587 B1 | 7/2001 | Smith, Jr. |
| 6,286,559 B1 | 9/2001 | Palvolgyi |
| 6,390,124 B1 * | 5/2002 | Kido ............... B21C 37/065 123/516 |
| 6,467,464 B2 | 10/2002 | Burke et al. |
| 6,508,501 B1 | 1/2003 | Meinke |
| 6,523,582 B2 | 2/2003 | Furuta |
| 6,675,841 B2 | 1/2004 | Burns |
| 6,851,458 B2 | 2/2005 | Nakajima et al. |
| 7,073,681 B2 * | 7/2006 | Abe ............... B63B 25/082 220/375 |
| 7,481,101 B2 | 1/2009 | Matsubara et al. |
| 7,617,851 B2 | 11/2009 | Barnes et al. |
| 2002/0153374 A1 | 10/2002 | Isobe |
| 2006/0032482 A1 * | 2/2006 | Sung ............... F02M 25/089 123/518 |
| 2007/0215123 A1 | 9/2007 | Ito et al. |
| 2009/0107583 A1 * | 4/2009 | Benjey ............... B60K 15/04 141/350 |

* cited by examiner

VEHICLE FUEL VAPOR RECOVERY SYSTEM

BACKGROUND

1. Field of the Invention

The present invention generally relates to a vehicle fuel vapor recovery system. More specifically, the present invention relates to a vehicle fuel vapor recovery system that includes a vent structure located at a fuel filler tube of a vehicle.

2. Background Information

During a vehicle refueling process, as fuel fills a fuel tank of the vehicle, air within the fuel tank is displaced. The displaced air typically includes hydrocarbon compounds that have vaporized from the liquid fuel within the fuel tank. New vehicles are typically equipped with a fuel vapor recovery system that includes a charcoal filled filter canister. The filter canister is configured to capture the hydrocarbons present in air escaping from the fuel tank during a vehicle refueling process.

Later, when the engine of the vehicle is operating, the fuel vapor recovery system is configured such that fresh air is allowed to flow into the filter canister, drawing the hydrocarbons out of the filter canister. This fresh air and the captured hydrocarbons are then fed into the engine and combusted along with liquid fuel from the fuel tank. The filter canister is connected to a vent that is positioned to draw the fresh air in when the engine is operating. The vent is typically located somewhere under a fender or other body panel of the vehicle drawing air in from under the vehicle.

SUMMARY

One object of the disclosure is to provide a fuel vapor recovery system of a vehicle with a protected air vent chamber that vents air to a fuel filler compartment and also draws fresh air in from the fuel filler compartment.

Another object of the disclosure is to provide a fuel vapor recovery system of a vehicle with an air vent for a vehicle fuel vapor recovery system that is protected from weather extremes and outdoor debris.

In view of the state of the known technology, one aspect of the disclosure of a vehicle fuel vapor recovery system includes a compartment wall structure, a fuel filler tube and an air vent chamber structure. The compartment structure has an interior surface defining a fuel filler compartment and an exterior surface, with a tube receiving opening extending from the interior surface to the exterior surface and a vent opening extending from the interior surface to the exterior surface. The fuel filler tube has an outer surface, an inner surface, a fuel receiving end and a fuel tank attachment end opposite the fuel receiving end. The fuel receiving end defines a filler opening. The inner surface defines a fuel passageway that extends from the filler opening to the fuel tank attachment end. The fuel receiving end extends through the tube receiving opening such that the fuel receiving end and the filler opening are located within the fuel filler compartment and the fuel tank attachment end is located outside the fuel filler compartment. The air vent chamber structure is located outside of the fuel filler compartment and has a first wall and a second wall. The first wall has a first end contacting the exterior surface of the compartment wall structure. The second wall extends from a second end of the first wall toward the outer surface of the fuel filler tube. The first wall, the second wall, a portion of the outer surface of the fuel filler tube, and a portion of the exterior surface of the fuel filler compartment cooperate to define an air vent chamber being in fluid communication with the vent opening of the compartment wall structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
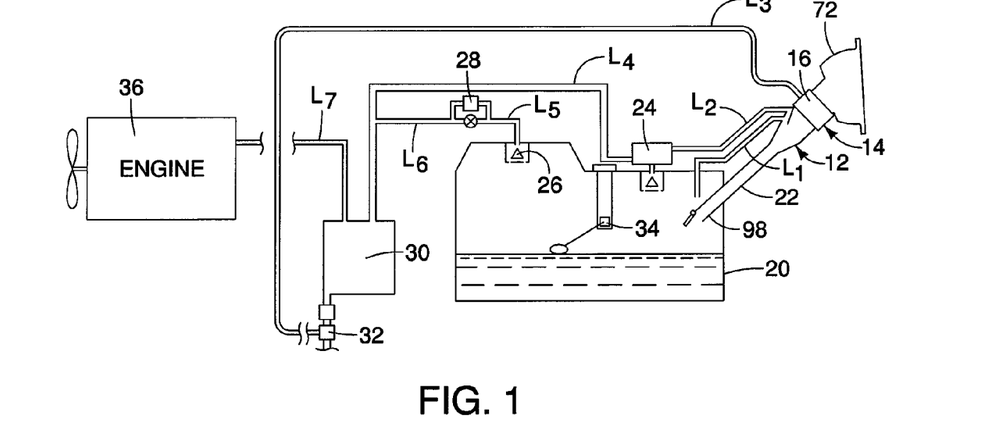
FIG. 1 is a schematic view of a fuel vapor recovery system of a vehicle that includes an air vent chamber that is connected to a fuel filler compartment in accordance with a first embodiment.

Referring initially to FIG. 1, a fuel vapor recovery system 10 that includes a fuel filler tube assembly 12 having an air vent chamber structure 14 defining an air vent chamber 15 is illustrated in accordance with a first embodiment. The air vent chamber 15 is partially defined by a collar 16 that is installed to the fuel filler tube assembly 12, as is described in greater detail below after a brief description of parts of the fuel vapor recovery system 10.

The fuel vapor recovery system 10 basically includes a fuel tank 20, a fuel filler tube 22, a refueling control valve 24, a vapor cutoff valve 26, an engine vacuum cut-off valve 28, a filter canister 30, a vent valve 32, a fuel level sensor 34, the air vent chamber structure 14 and associated vent lines that provide sealed fluid communication between connected elements. Specifically, a first line $L_1$ connects the fuel filler tube 22 to the fuel tank 20; a second line $L_2$ connects the fuel filler tube 22 to the refueling control valve 24; a third line $L_3$ connects the air vent chamber 15 to the vent valve 32; a fourth line $L_4$ connects the refueling control valve 24 to the filter canister 30; a fifth line $L_5$ connects the vapor cutoff valve 26 to the engine vacuum cut-off valve 28; a sixth line $L_6$ connects the engine vacuum cut-off valve 28 to the filter canister 30 and a seventh line $L_7$ connects the filter canister 30 to an intake manifold (not shown) of an engine 36 in a conventional manner.

It should be understood from the drawings and the description herein that a fuel delivery system (not shown) is configured to draw liquid fuel from the fuel tank 20 and deliver it to the engine 36, while the engine 36 is operating. Since the fuel delivery system (not shown) is a conventional system, further description is omitted for the sake of brevity.

The fuel vapor recovery system 10 is configured to operate the refueling control valve 24, the engine vacuum cut-off valve 28 and the vent valve 32 to direct vapors exiting the fuel tank 20 during refueling to the filter canister 30. The filter canister 30 is filled with a hydrocarbon absorbing material, such as, for example, charcoal. The hydrocarbon absorbing material absorbs hydrocarbons during the re-fueling process. Thereafter, while the engine 36 of the vehicle 10 is operating, the refueling control valve 24, the engine vacuum cut-off valve 28 and the vent valve 32 are operated to draw fresh air in from the air vent chamber 15 via the third line $L_3$, and pass the fresh air through the filter canister 30. The fresh air flowing through the filter canister 30 draws the hydrocarbons out of the hydrocarbon absorbing material such that the hydrocarbons are drawn through the line $L_7$ to the engine 36, where the hydrocarbons are consumed in the combustion process. The fuel vapor recovery system 10 includes a controller (not shown) that controls the refueling control valve 24, the engine vacuum cut-off valve 28 and the vent valve 32 and detects the fuel level sensed by the fuel level sensor 34. One example of the configuration of the controller (not shown) and overall operation of the fuel vapor recovery system 10 is further described in U.S. Patent Application Publication No. 2002/0153374, filed Mar. 29, 2002, (assigned to Nissan Motor Co. Ltd.), which is incorporated herein in its entirety. There are alternative ways of configuring a controller and operating the fuel vapor recovery system 10.

It should be understood from the drawings and description herein, that the basic elements of the fuel vapor recovery system described in U.S. Patent Application Publication No. 2002/0153374 can be altered and re-arranged in order to achieve the fuel vapor recovery system 10 described herein. However, it should be understood that the specific embodiments described herein include the unique features of the fuel filler tube assembly 12, and the air vent chamber structure 14 which are not disclosed or suggested in U.S. Patent Application Publication No. 2002/0153374. More specifically, the fuel filler tube assembly 12, and the air vent chamber structure 14 described herein can be employed with other fuel vapor recovery systems that differ from that disclosed in U.S. Patent Application Publication No. 2002/0153374.

Figure 2:
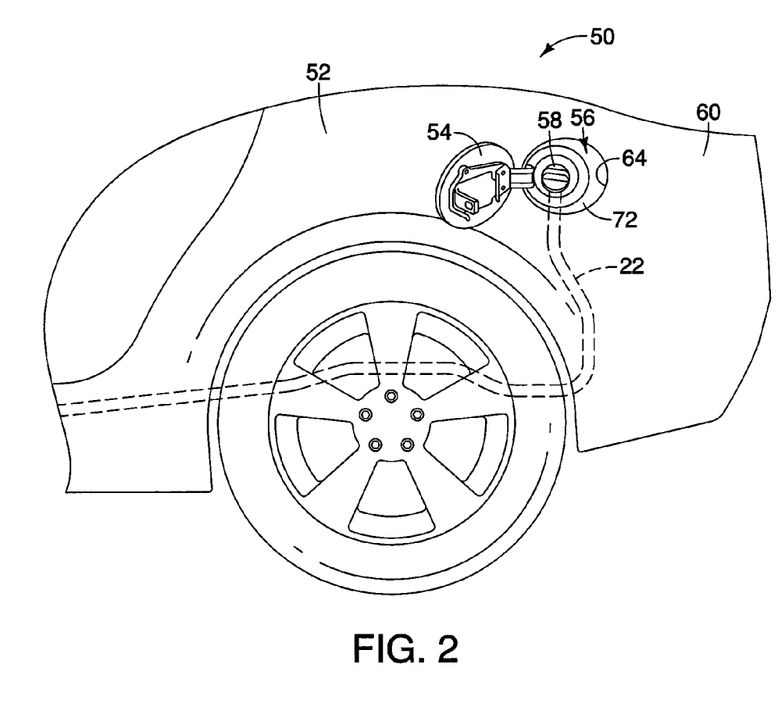
FIG. 2 is a side view of a rearward portion of a vehicle showing an exterior surface of a side body panel that at least partially defines the fuel filler compartment of the fuel vapor recovery system in accordance with the first embodiment.

FIG. 2 shows rear portion of a vehicle 50 that includes the fuel filler tube assembly 12. More specifically, the vehicle 50 includes a side body panel 52, a fuel door 54, a fuel filler compartment 56, with the fuel filler tube 22 exposed with the fuel door 54 in an open position, as shown in FIG. 2.

Figure 4:
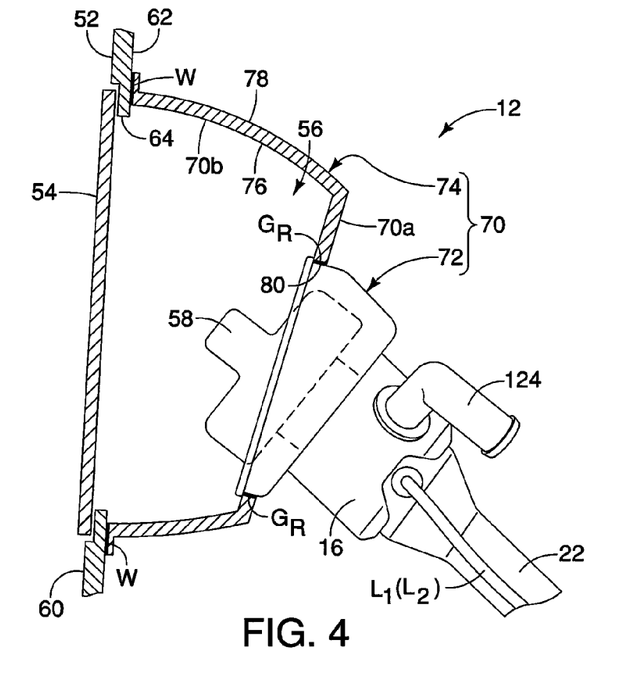
FIG. 4 is a partial cross-sectional view of the side body panel showing details of the fuel filler compartment, and a fuel filler tube assembly that includes a cap protector, a fuel filler tube and a collar that at least partially define the air vent chamber in accordance with the first embodiment.

As shown in FIGS. 2 and 4, a removable fuel filler cap 58 is removably installed to the fuel filler tube 22 such that with the removable fuel filler cap 58 installed, the fuel filler tube 22 is sealed off from the fuel filler compartment 56. However, as is described in greater detail below, when the removable fuel filler cap 58 is installed to the fuel filler tube 22, the air vent chamber 15 continues to be in fluid communication with the fuel filler compartment 56.

Figure 3:
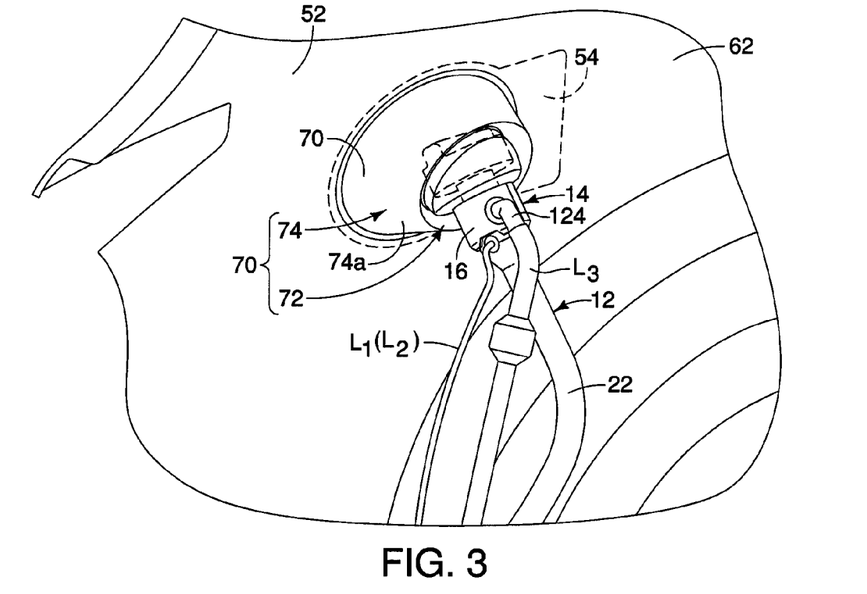
FIG. 3 is perspective view of the rearward portion of a vehicle showing an interior (hidden) surface of the side body panel, the fuel filler compartment and the air vent chamber of the fuel vapor recovery system in accordance with the first embodiment.

The side body panel 52 has an exterior surface 60 (FIG. 2), an interior surface 62 (FIG. 3) and a compartment opening 64 that extends from the exterior surface 60 to the interior surface 62, as shown in FIG. 4. As shown in FIG. 3, the third line $L_3$ extends from the fuel filler tube 22 behind the side body panel 52, hidden from view.

As shown in FIG. 3, the fuel filler tube assembly 12 and the fuel filler tube 22 extend inward from the fuel filler compartment 56 away from the interior surface 62 and toward the fuel tank 20 (shown in FIG. 1). The fuel filler tube 22 further extends from the fuel filler compartment 56, which is described in greater detail below.

It should be understood from the drawings and the description herein, that the fuel filler compartment 56, fuel filler tube assembly 12 and the fuel filler tube 22 can be installed at any of a variety of locations around the vehicle 10. Specifically, the fuel filler compartment 56 and the fuel filler tube 22 can be installed within a rear storage area (the trunk) of the vehicle 50, behind a rear license plate support structure (not shown) or other location of the vehicle 50. The fuel filler compartment 56 and the fuel filler tube 22 can also be installed at locations around a front portion of the vehicle 50. In other words, the drawings only depict one location of the fuel filler compartment 56 on the vehicle 50, but not the only location.

As shown in FIG. 4, the fuel filler compartment 56 is defined by the side body panel 52, the fuel door 54 and a compartment wall structure 70. The compartment wall structure includes an inboard surface 70a and an outboard surface 70b. As shown in FIG. 4, the compartment wall structure 70 is further defined by a cap protector 72 and an intermediate wall structure 74, as is described in greater detail below. However, alternatively, the compartment wall structure 70 can be defined as a single monolithic element, or any combination of the cap protector 72 and the intermediate wall structure 74 as desired or required. For example, the cap protector 72 and the intermediate wall structure 74 can be formed of a single metallic member, molded or pressed to form the combined shapes of the cap protector 72 and the intermediate wall structure 74 that is then welded to the side body panel 52. Further, the compartment wall structure 70 can be formed as an integral part of the side body panel 52, where the side body panel 52 is molded or pressed to include the overall shapes and/or functions of the cap protector 72 and the intermediate wall structure 74.

The fuel door 54 is moveably fixed to the side body panel 52 by a hinge structure for movement between an open position shown in FIG. 2 and a closed position shown in FIG. 4. In the closed position, the fuel door 54 covers the compartment opening 64 protecting the fuel filler compartment 56. In the open position, the fuel door 54 exposes the fuel filler tube 22 making refueling possible.

Figure 8:
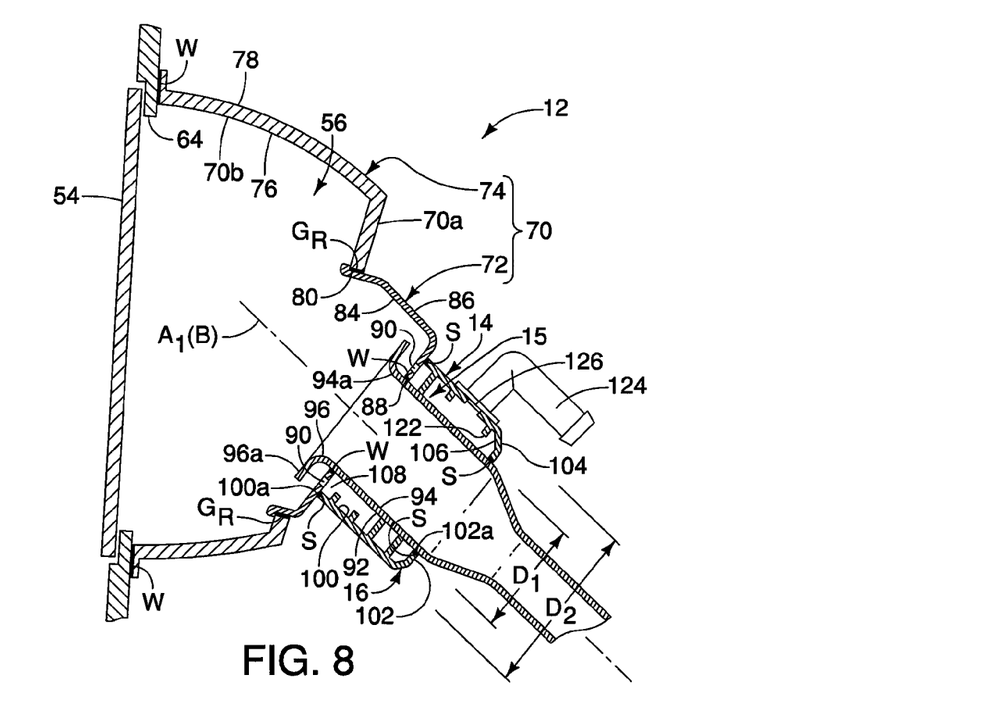
FIG. 8 is a cross-sectional view of the fuel filler compartment and the fuel filler tube assembly showing details of the collar that at least partially forms the air vent chamber in accordance with the first embodiment.

As shown in FIGS. 4 and 8, the intermediate wall structure 74 is welded to the interior surface 62 of the side body panel 52 at welds W and surrounds the compartment opening 64 in the side body panel 52. The intermediate wall structure 74 is dimensioned to provide sufficient space to define an outboard portion of the fuel filler compartment 56 as shown in FIG. 4. The intermediate wall structure 74 includes an interior surface 76 (interior relative to the fuel filler compartment 56) that defines a first portion of the outboard surface 70b of the compartment wall structure 70, and an exterior surface 78 that is exposed behind the side body panel 52 and defines a first portion of the inboard surface 70a of the compartment wall structure 70. The intermediate wall structure 74 also includes an opening 80 that extends from the interior surface 76 to the exterior surface 78.

Figure 7:
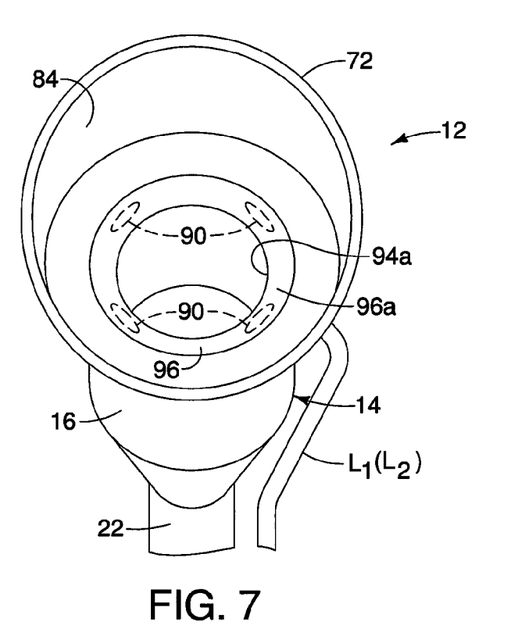
FIG. 7 is a plan view of the fuel filler tube assembly showing the cap protector and a fuel receiving end of the fuel filler tube in accordance with the first embodiment.

As shown in FIGS. 7 and 8, the cap protector 72 includes a first surface 84 and a second surface 86. The first surface 84 defines a second portion of the outboard surface 70b of the compartment wall structure 70. The second surface 86 defines a second portion of the inboard surface 70a of the compartment wall structure 70. The cap protector 72 further includes a tube receiving opening 88 and a plurality of vent openings 90. The tube receiving opening 88 and the vent openings 90 extend from the first surface 84 to the second surface 86. However, the vent openings 90 are circumferentially spaced apart from one another and are spaced radially outward of the tube receiving opening 88. The cap protector 72 defines an inboard portion of the fuel filler compartment 56 as shown in FIG. 8 and an inboard portion of the compartment wall structure 70.

The compartment wall structure 70 (the cap protector 72 and the intermediate wall structure 74) defines the tube receiving opening 88 that extends from the inboard surface 70a to the outboard surface 70b of the compartment wall structure 70. A portion of the fuel filler tube 22 extends through the tube receiving opening 88 into the fuel filler compartment 56 and is attached to the compartment wall structure 70 at the tube receiving opening 88 of the cap protector 72.

As mentioned above, the first surface 84 of the cap protector 72 and the interior surface 76 of the intermediate wall structure 74 at least partially define the fuel filler compartment 56. Alternatively, the opening 80 of the intermediate wall structure 74 could be made smaller to act as the tube receiving opening 88, and the fuel filler tube 22 could be inserted into the opening 80 and attached directly to the intermediate wall structure 74; and the vent openings 90 could be formed in the intermediate wall structure 74 surrounding the opening 80 circumferentially spaced apart from one another and spaced radially outward from the opening 80.

It should be understood from the drawings and the description herein, that the compartment wall structure 70, and in particular, the intermediate wall structure 74, can alternatively be formed by welding a plurality of separate elements together to achieve the depicted shape. Further, the intermediate wall structure 74 can be made of a plurality of sheet metal panels welded together to form a rectangular box-like shape.

For simplified manufacturing, the elements that define the compartment wall structure 70 can be separately manufactured. Specifically, the intermediate wall structure 74 can be manufactured separately from the cap protector 72. Further, the cap protector 72 can be assembled to the fuel filler tube 22 to define the fuel filler tube assembly 12.

A description of the fuel filler tube assembly 12 is now provided with specific reference to FIGS. 4-8. The fuel filler tube assembly 12 basically includes the fuel filler tube 22, the cap protector 72 and the collar 16. The fuel filler tube assembly 12 can be assembled prior to being fitted to the vehicle 50. For example, the cap protector 72 and the fuel filler tube 22 are welded together at welds W. Thereafter, the cap protector 72 is inserted into the opening 80 of the intermediate wall structure 74 and with a grommet $G_R$ positioned therebetween such that the intermediate wall structure 74 and the cap protector 72 are basically friction fitted together via the grommet $G_R$. The collar 16 can be installed to the fuel filler tube 22 either prior to or after installation of the fuel filler tube 22 and cap protector 72 to the intermediate wall structure 74.

As shown in FIGS. 7 and 8, the tube receiving opening 88 and the vent openings 90 extend from the first surface 84 to the second surface 86 of the cap protector 72.

The fuel filler tube 22 includes an outer surface 92, an inner surface 94 (FIG. 7), a fuel receiving end 96, a fuel tank attachment end 98 (FIG. 1) and alignment pins 92a (only one alignment pin 92a is shown in the drawings). The inner surface 94 defines a filler opening 94a and a fuel passageway that extends from the fuel receiving end 96 to the fuel tank attachment end 98. Thus, a vehicle operator can refuel the vehicle 50 by pumping fuel into the filler opening 94a at the fuel receiving end 96 where it will be directed through the fuel passageway of the fuel filler tube 22 into the fuel tank 20. As shown in FIG. 1, the fuel tank attachment end 98 is connected to the fuel tank 20.

The fuel receiving end 96 of the fuel filler tube 22 extends through the tube receiving opening 88 of the cap protector 72 such that the fuel receiving end 96 and the filler opening 94a are located within the fuel filler compartment 56. However, the majority of the fuel tank filer tube 22 and the fuel tank attachment end 98 are located outside the fuel filler compartment 56 behind the side body panel 52.

The fuel receiving end 96 of the fuel filler tube 22 includes an annular flange 96a. As shown in FIG. 7, the annular flange 96a is flared radially outwardly relative to the filler opening 94a with a distal edge thereof extending over the vent openings 90. Further, as viewed in FIG. 7 along a central axis of the filler opening 94a, the annular flange 96a conceals the vent openings 90.

The two alignment pins 92a are disposed at opposite sides of the fuel filler tube 22. The alignment pins 92a can be formed with the fuel filler tube 22 or can be metallic pins welded to the fuel filler tube 22 at predetermined locations. The alignment pins 92a are located on the fuel filler tube 22 in order to precisely position the collar 16 on the fuel filler tube 22 relative to the compartment wall structure 70, as described in greater detail below.

The air vent chamber 15 is defined outside of the fuel filler compartment 56. More specifically, the air vent chamber 15 is a space that is confined by the collar 16, a portion of the outer surface 92 of the fuel filler tube 22 surrounded by the collar 16 and a portion of the outboard surface 70b of the compartment wall structure 70 covered by the collar 16. Further, the portion of the outboard surface 70b of the compartment wall structure 70 covered by the collar 16 is defined by the second surface 86 of the cap protector 72, as shown in FIG. 8.

The collar 16 is a cylindrical or ring shaped structure that includes an annular wall 100. The collar 16 has an outer collar surface 104 and an inner collar surface 106. With the collar 16 installed around the fuel filler tube 22, the annular wall 100 is located outside of the fuel filler compartment 56 adjacent to the second surface 86 of the cap protector 72, as shown in FIG. 8. Further, an annular surface 100a of the annular wall 100 contacts the outboard surface 70b of the compartment wall structure 70 defined by the second surface 86 of the cap protector 72 (as shown in FIG. 8) and can include an optional seal S located between the annular surface 100a of the annular wall 100 and the exterior surface 78, thereby partially sealing the air vent chamber 15. It should be understood from the drawings and the description herein that the seal S between the annular surface 100a of the annular wall 100 and the second surface 86 of the cap protector 72 can be replaced with an adhesive material or sealant material.

The annular wall 100 is basically a cylinder that completely encircles or surrounds the fuel filler tube 22. The annular wall 100 is basically circumferentially equidistant from the outer surface 92 of the fuel tank filler tube 22. The fuel receiving end 96 of the fuel filler tube 22 defines an axis A, and the annular wall 100 of the collar defines an axis B that is coaxial with the axis A when installed to the fuel filler tube 22. The annular wall 100 is a side wall of the collar 16. The collar 16 also includes an end wall 102. The annular wall 100 has a first end that is contiguous with the end wall, and a second end opposite the end wall 102. The end wall has an inner surface 102b that is continuous with the inner collar surface 106, and an outer surface 102c that is continuous with the outer collar surface 104. As shown in FIG. 8, at least a portion of the end wall 102 extends in a direction that is perpendicular to the annular wall 100. More specifically, the annular wall 100 extends in an axial direction along an axis A as shown in FIG. 8. The end wall 102 extends radially inward from the annular wall 100 toward the axis A.

More specifically, the end wall 102 extends radially inwardly from the annular wall 100 with a tube receiving surface 102a extending from the inner surface 102b to the outer surface 102c and contacting the outer surface 92 of the fuel filler tube 22. Another seal S can optionally be provided along the tube receiving surface 102a of the end wall 102 contacting the outer surface 92 of the fuel filler tube 22, thereby further sealing the air vent chamber 15, as shown in FIG. 8. Hence, the air vent chamber 15 is defined by the portion of the outer surface 92 of the fuel filler tube 22 surrounded by the collar 16, the inner collar surface 106 of the collar 16, the end wall 102 of the collar 16 and the covered portion of the second surface 86 of the cap protector 72. As shown in FIG. 8, when installed to the fuel filler tube 22, the upper end of the collar 16 defines an opening 108 that overlaps the vent openings 90 in the cap protector 72. Specifically, the inner collar surface 106 of the collar 16 is spaced apart from the outer surface 92 defining the opening 108. It should be understood from the drawings and the description herein that the seal S between the tube receiving surface 102a of the end wall 102 and the outer surface 92 of the fuel filler tube 22 can be replaced with an adhesive material or sealant material.

The collar 16 is dimensioned such that the vent openings 90 in the cap protector 72 provide fluid communication between the fuel filler compartment 56 and the air vent chamber 15. In other words, the outer surface 92 of the fuel filler tube 22 has a diameter $D_1$ and the inner collar surface 106 of the collar 16 has a diameter $D_2$ with the diameter $D_2$ being larger than the diameter $D_1$. The vent openings 90 are located radially outward of the outer surface 92 of the fuel filler tube 22 and located radially inward of the inner collar surface 106 of the collar 16. Consequently, the opening 108 of the collar 16 is open to the vent openings 90. Thus, the vent openings 90 serve as a conduit or duct between the fuel filler compartment 56 and the air vent chamber 15.

Figure 6:
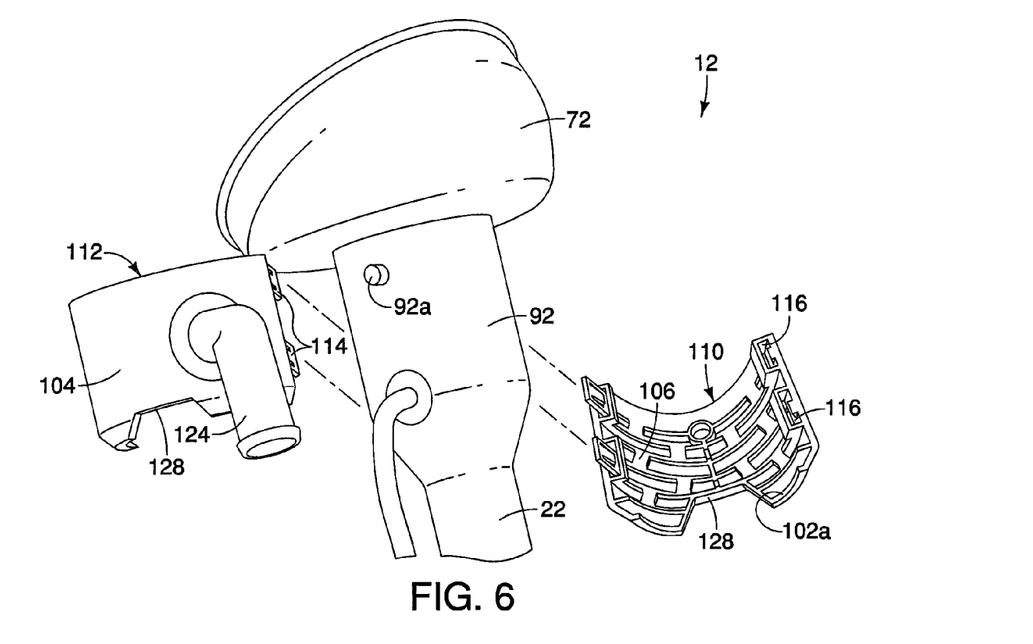
FIG. 6 is an exploded view of the fuel filler tube assembly showing the cap protector, the fuel filler tube and two half collar sections that define the collar in accordance with the first embodiment.

A further description of the collar 16 in accordance with the first embodiment is now provided with reference to FIGS. 6 and 9-12. As shown in FIG. 6, the collar 16 includes a first half collar section 110 and a second half collar section 112. Both the first half collar section 110 and the second half collar section 112 includes snap-fitting projections 114 and mating openings 116 such that the snap-fitting projections 114 snap into the openings 116 locking the first half collar section 110 to the second half collar section 112 to form the annular ring shape of the collar 16. Both the first half collar section 110 and the second half collar section 112 define respective sections of the inner collar surface 106 and have open areas at an upper end thereof that define the opening 108. The first half collar section 110 and the second half collar section 112 can include a seal between their respective mating surfaces or can be sealed with an adhesive material or sealant material.

Figure 9:
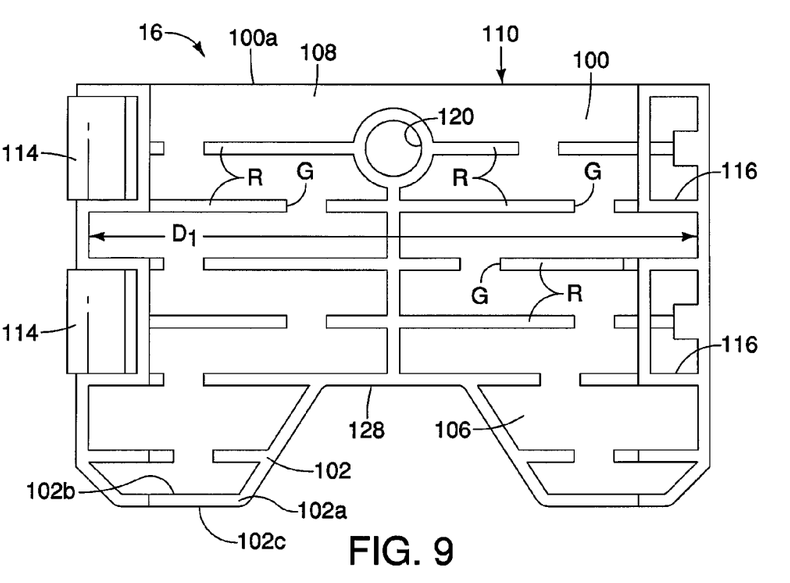
FIG. 9 is a side view of a first half collar section of the collar showing ribs on an inner surface of the first half collar section that define an air flow passageway in accordance with the first embodiment.

As shown in FIG. 9, the first half collar section 110 defines half of the annular surface 100a of the annular wall 100, half of the tube receiving surface 102a defined by the end wall 102 and half of the inner collar surface 106. An alignment concavity 120 is formed at a central location on the inner collar surface 106. The alignment concavity 120 is located to receive the alignment pins 92a such that the collar 16 is positioned relative to the fuel filler tube 22 at a predetermined location and remains in position once installed. Further, the inner collar surface 106 includes a plurality of ribs R that extend in directions parallel to one another. The ribs R are spaced apart from one another relative to an axial direction of the collar 16 and contact the outer surface 92 of the fuel filler tube 22. Further, the ribs R are interrupted with sections being removed to form a series of gaps G. The arrangement of ribs R and gaps G are staggered at least partially defining an airflow passage way, as is described in greater detail below in the description of the second half collar section 112.

Figure 10:
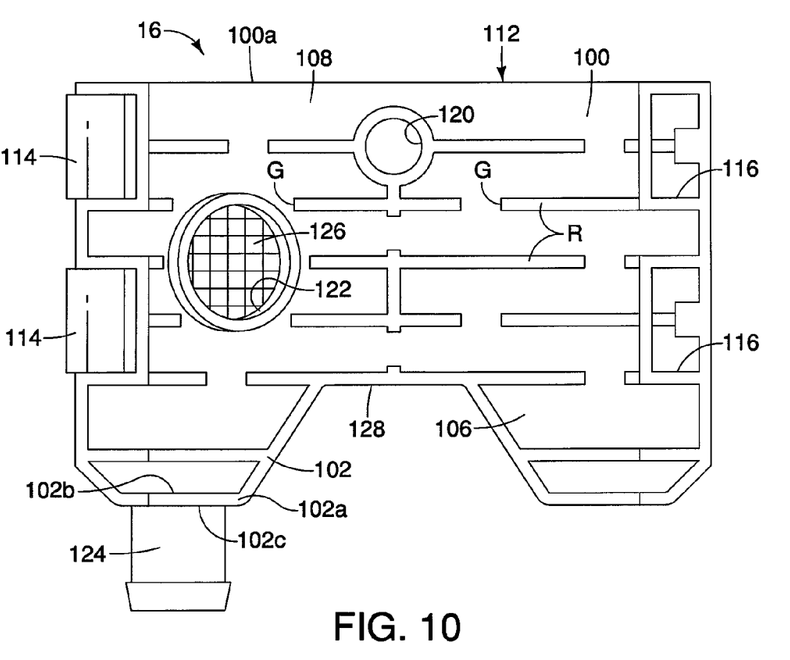
FIG. 10 is a side view of a second half collar section of the collar showing ribs on an inner surface of the second half collar section that further define the air flow passageway in accordance with the first embodiment.
Figure 11:
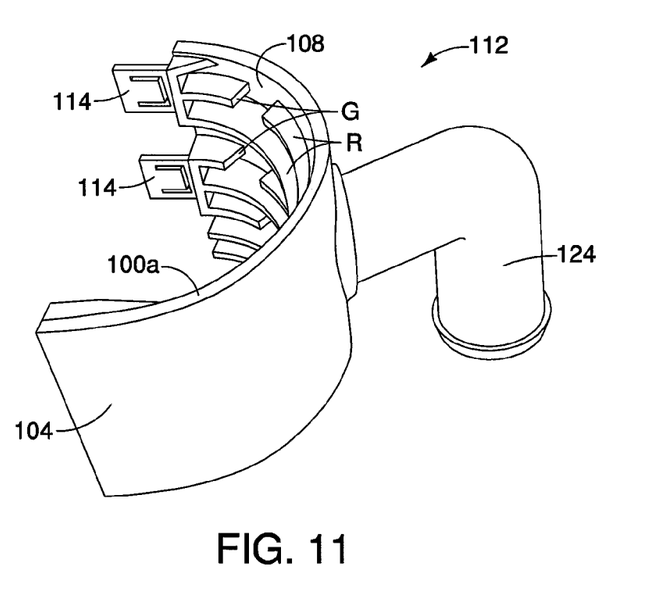
FIG. 11 is a perspective view of the second half collar section of the collar showing a tube fitting that is connected to a vent opening of the second half collar section in accordance with the first embodiment.
Figure 12:
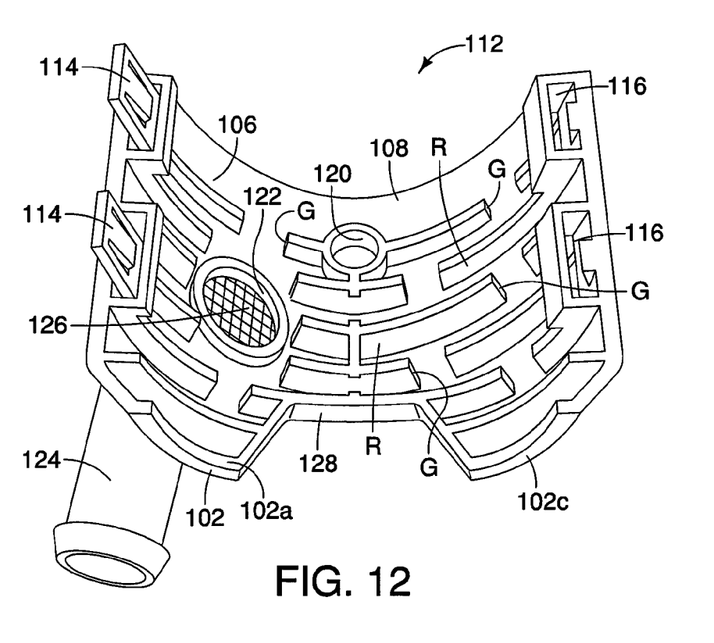
FIG. 12 is another perspective view of the second half collar section of the collar showing the ribs that define the air flow passageway and the vent opening of the second half collar section in accordance with the first embodiment.

As shown in FIGS. 10-12, the second half collar section 112 defines a second half of the annular surface 100a of the annular wall 100, a second half of the tube receiving surface 102a defined by the end wall 102 and a second half of the inner collar surface 106. Another alignment concavity 120 is formed at a central location on the inner collar surface 106. The alignment concavity 120 is located to receive the alignment pins 92a such that the collar 16 is positioned relative to the fuel filler tube 22 at a predetermined location and remains in position once installed. The inner collar surface 106 of the second half collar section 112 is also interrupted by a chamber opening 122 that is in fluid communication with an elbow fitting 124 installed to the outer collar surface 104 of the second half collar section 112. The elbow fitting 124 is therefore in fluid communication with the air vent chamber 15 with the collar 16 installed to the fuel filler tube 22. Further, like the first half collar section 110, the inner collar surface 106 of the second half collar section 112 also includes a corresponding plurality of ribs R that extend in directions parallel to one another.

The ribs R are spaced apart from one another relative to an axial direction of the collar 16. Further, the ribs R are interrupted with sections being removed to form a series of gaps G. The arrangement of ribs R and gaps G are staggered at least partially defining the above mentioned airflow passage way. Specifically, the airflow passageway is a non-linear, staggered path that extends from the opening 108 and eventually flows to the chamber opening 122. When the first half collar section 110 and the second half collar section 112 are installed to one another and installed to the fuel filler tube 22, the ribs R and gaps G of the first half collar section 110 and the second half collar section 112 combine to make a labyrinth or maze that venting air must follow as it travels between the fuel filler compartment 56, the air vent chamber 15, the chamber opening 122 and the line $L_3$. The airflow passageway acts as a filter, preventing debris and moisture from passing in or out of the chamber opening 122. Also, the chamber opening 122 includes a screen 126 that also serves as a filter to prevent insects and/or debris from moving through the chamber opening 122. The screen 126 can have a fine mesh material with very small openings or can be a coarser screen material with larger openings. As shown in FIG. 8, the chamber opening 122 and the elbow fitting 124 are located above a majority of the air vent chamber 15. Hence, debris and moisture that might enter the air vent chamber 15 is further inhibited by gravity from entering the chamber opening 122.

When the first half collar section 110 and the second half collar section 112 are attached to one another defining the collar 16, the annular surface 100a of the annular wall 100 is a circular or annular shaped surface that contacts the second surface 86 of the cap protector 72, as described above, Further, when the first half collar section 110 and the second half collar section 112 are attached to one another defining the collar 16, the tube receiving surface 102a is a surface that completely encircles or surrounds the outer surface 92 of the fuel filler tube 22. In the depicted embodiment, the tube receiving surface 102a is not annular but has a serpentine shape due to the inclusion of symmetrical recesses 128.

Figure 5:
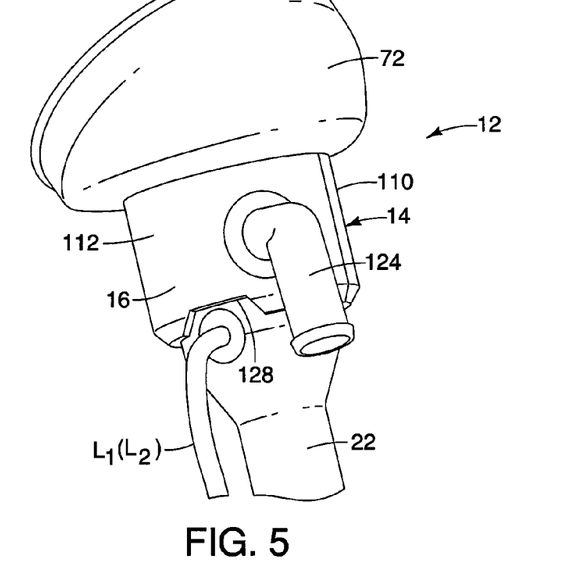
FIG. 5 is a perspective view the fuel filler tube assembly removed from the side body panel and the fuel filler compartment showing the cap protector, the fuel filler tube and the collar of the air vent chamber in accordance with the first embodiment.

The first half collar section 110 and the second half collar section 112 each include the recesses 128. As shown in FIG. 5, the recesses 128 provide space for the line $L_1(L_2)$ that vents the fuel filler tube 22 below the removable fuel filler cap 58.

As shown in FIG. 3 the elbow fitting 124 of the collar 16 is connected to the line $L_3$. Hence, the air vent chamber 15 is in fluid communication with the filter canister 30. It should be understood from the drawings and the description herein that the removable fuel filler cap 58 does not impede the movement of air between the air vent chamber 15 and the fuel filler compartment 56.

It should also be understood from the drawings and the description herein that the first half collar section 110 and the second half collar section 112 are identical to one another except that the second half collar section 112 includes the chamber opening 122, the elbow fitting 124 and the screen 126. Otherwise, the first half collar section 110 and the second half collar section 112 are identical and mate together to define the collar 16 in the first embodiment.

It should be understood from the drawings and the description herein that the air vent chamber structure 14 can be constructed and/or formed in any of a variety of ways. For example, the collar 16 can be replaced with a half collar arrangement that attaches to the fuel filler tube 22 in order to define the air vent chamber 15.

It should also be understood from the drawings and description herein, that the fuel door 54 does not provide an air tight seal between an exterior of the vehicle 50 and the fuel filler compartment 56. Therefore, air can move relatively freely between the fuel filler compartment 56 and the exterior of the vehicle 50. However, the fuel door 54 protects and covers the fuel filler compartment 56 preventing debris and dirt from entering the fuel filler compartment 56. Therefore, the location of the air vent chamber 15 and the ability for air to move freely between the air vent chamber 15 and the fuel filler compartment 56 provides a clean environment for the movement of air to and from the filter canister 30 during operation of the fuel vapor recovery system 10.

In the depicted embodiment, the inner collar surface 106 of the collar 16 (an end wall) and outer surface 92 of the fuel filler tube 22 are parallel to one another with the collar 16 fully installed.

Second Embodiment

Figure 13:
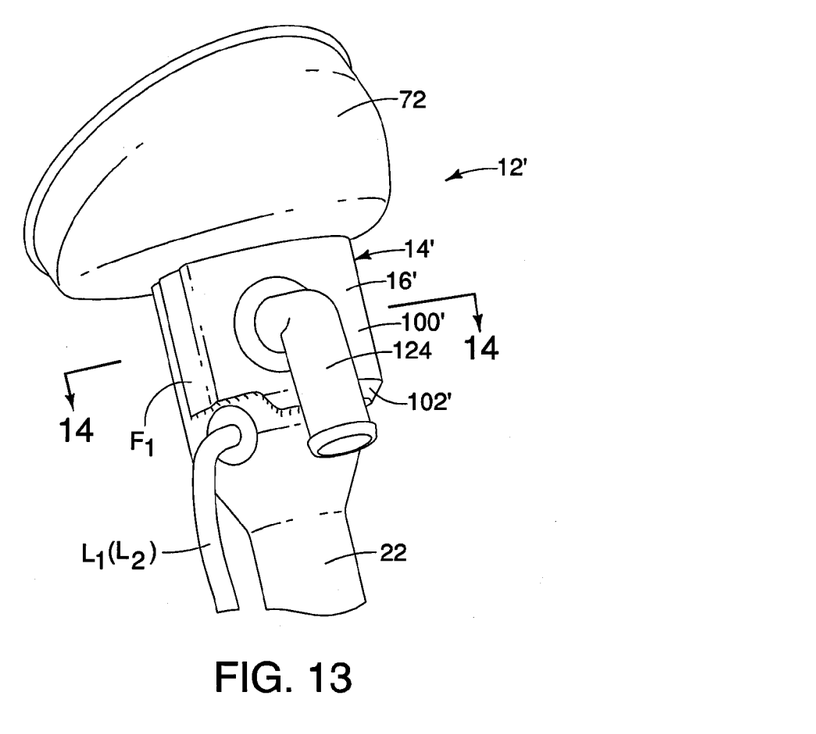
FIG. 13 is a perspective view of a fuel filler tube assembly in accordance with a second embodiment.
Figure 14:
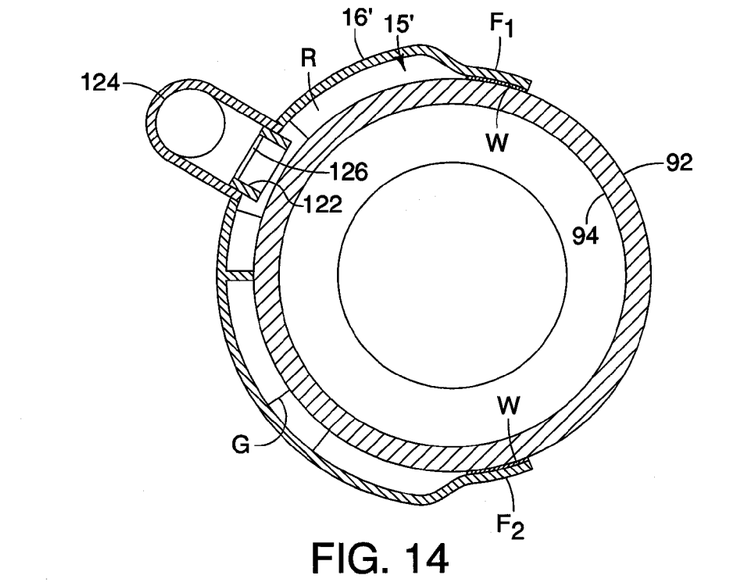
FIG. 14 is a cross-sectional view of the fuel filler tube assembly taken along the line 14-14 in FIG. 13 showing an alternate configuration of an air vent chamber in accordance with the second embodiment.

Referring now to FIGS. 13 and 14, a fuel filler tube assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the fuel filler tube assembly 12' replaces the fuel filler tube assembly 12 of the first embodiment in the fuel vapor recovery system 10, but includes many of the structural elements of the fuel filler tube assembly 12 of the first embodiment. In the second embodiment, the fuel filler tube assembly 12' includes the fuel filler tube 22 of the first embodiment and the cap protector 72. However, in the second embodiment, the collar 16 from the air vent chamber structure 14 is eliminated and replaced with a collar 16' from an air vent chamber structure 14'. The collar 16' only extends part way around the fuel filler tube 22. The collar 16' includes a first attachment flange $F_1$ and a second attachment flange $F_2$ that are fixedly attached to the fuel filler tube 22 at circumferentially spaced apart locations. The first wall 100' of the air vent chamber structure 14' extends from the first attachment flange $F_1$ to the second attachment flange $F_2$. The first wall 100' partially surrounds the outer surface 92 of the fuel filler tube 22 to define an air vent chamber 15' between the first wall 100', the second wall 102', the outer surface 92 of the fuel filler tube 22, and the exterior surface 86 of the cap protector 72.

In the first embodiment, the collar 16 can be made of a plastic or polymer material. In the second embodiment, the collar 16' is made of metal, and the first attachment flange $F_1$ and the second attachment flange $F_2$ are welded to the side of the fuel filler tube 22 at welds W, thereby defining the air vent chamber 15'. The collar 16' includes ribs R having gaps G, forming a labyrinth that defines an air flow passageway similar to that of the collar 16 of the first embodiment. The collar 16' further includes the chamber opening 122, the elbow fitting 124 and the screen 126 of the first embodiment. The collar 16' joins with the cap protector 72 providing ventilation between the air vent chamber 15' and the fuel filler compartment 56 in a manner consistent with the first embodiment.

The controller (not shown) of the fuel vapor recovery system 10 preferably includes a microcomputer with a fuel vapor recovery system control program that controls the fuel vapor recovery system 10. The controller can also include other conventional components such as an input interface circuit, an output interface circuit, and storage devices such as a ROM (Read Only Memory) device and a RAM (Random Access Memory) device. The microcomputer of the controller is programmed to control the fuel vapor recovery system 10. The internal RAM of the controller stores statuses of operational flags and various control data. The internal ROM of the controller stores the information necessary for various operations of the fuel vapor recovery system 10. The controller is capable of selectively controlling any of the components of the control system in accordance with the control program. It will be apparent to those skilled in the art from this disclosure that the precise structure and algorithms for the controller of the fuel vapor recovery system 10 can be any combination of hardware and software that will carry out the functions of the present invention.

There are various components of the fuel vapor recovery system 10 and the vehicle 50 that are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the fuel vapor recovery system. Accordingly, these terms, as utilized to describe the present invention should be interpreted relative to a vehicle equipped with the fuel vapor recovery system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle fuel vapor recovery system comprising:
a compartment wall structure having an interior surface defining a fuel filler compartment, an exterior surface, a tube receiving opening extending from the interior surface to the exterior surface and a vent opening extending from the interior surface to the exterior surface;
a fuel filler tube having an outer surface, an inner surface, a fuel receiving end and a fuel tank attachment end opposite the fuel receiving end, the fuel receiving end defining a filler opening, the inner surface defining a fuel passageway that extends from the filler opening to the fuel tank attachment end, the fuel receiving end extending through the tube receiving opening such that the fuel receiving end and the filler opening are located within the fuel filler compartment and the fuel tank attachment end is located outside the fuel filler compartment; and
an air vent chamber structure located outside of the fuel filler compartment and having a first wall and a second wall, the first wall having a first end contacting the exterior surface of the fuel filler compartment, the second wall extending from the first wall toward the outer surface of the fuel filler tube, with the first wall, the second wall, a portion of the outer surface of the fuel filler tube and a portion of the exterior surface of the fuel filler compartment defining an air vent chamber being in fluid communication with the vent opening of the compartment wall structure, the fuel receiving end of the fuel filler tube including an annular flange located within the fuel filler compartment that conceals the vent opening as viewed within the fuel filler compartment along a central axis of the filler opening.

2. The vehicle fuel vapor recovery system according to claim 1, wherein
the compartment wall structure includes a body panel defining a compartment opening, an intermediate wall structure attached to the body panel and defining an outboard portion of the fuel filler compartment, and a cap protector attached to the wall structure and defining an inboard portion of the fuel filler compartment.

3. The vehicle fuel vapor recovery system according to claim 2, wherein
the cap protector defines the tube receiving opening and the vent opening.

4. The vehicle fuel vapor recovery system according to claim 1, wherein
the vent opening of the compartment wall structure comprises a plurality of vent openings that provide fluid communication between the fuel filler compartment and the air vent chamber, each of the plurality of vent openings being spaced apart from one another circumferentially around the tube receiving opening.

5. The vehicle fuel vapor recovery system according to claim 1, wherein
the vent opening of the compartment wall structure comprises a plurality of vent openings that provide fluid communication between the fuel filler compartment and the air vent chamber, each of the plurality of vent openings being spaced apart in a radial direction from the tube receiving opening.

6. The vehicle fuel vapor recovery system according to claim 1, wherein the first wall of the air vent chamber structure defines a chamber opening in fluid communication with the air vent chamber.

7. The vehicle fuel vapor recovery system according to claim 6, further comprising
a fuel tank; and
a filter canister having a first breather opening in fluid communication with the fuel tank and a second breather opening in fluid communication with the chamber opening of the air vent chamber structure.

8. The vehicle fuel vapor recovery system according to claim 6, wherein
the chamber opening is open to an upper portion of the air vent chamber.

9. The vehicle fuel vapor recovery system according to claim 1, wherein
the first wall of the air vent chamber structure completely encircles the outer surface of the fuel filler tube adjacent to the fuel filler compartment.

10. The vehicle fuel vapor recovery system according to claim 1, wherein
the compartment wall structure includes a plurality of vent openings in fluid communication with the air vent chamber, each of the vent openings being spaced apart from one another circumferentially around the tube receiving opening, and
the first wall of the air vent chamber structure includes an annular surface contacting the exterior surface of the compartment wall structure and surrounding the plurality of the vent openings.

11. The vehicle fuel vapor recovery system according to claim 1, wherein
the air vent chamber includes a first attachment flange and a second attachment flange that are fixedly attached to the fuel filler tube at circumferentially spaced apart locations, with the first wall of the air vent chamber structure extending from the first attachment flange to the second attachment flange, the first wall partially surrounding the outer surface of the fuel filler tube.

12. The vehicle fuel vapor recovery system according to claim 1, further comprising
a first seal located between the first wall of the air vent chamber structure and the exterior surface of the compartment wall structure, and
a second seal positioned between the second wall of the air vent chamber structure and the outer surface of the fuel filler tube.

13. A fuel filler tube assembly for a fuel vapor recovery system comprising:
a cap protector having a first surface and a second surface opposite the first surface, the first surface at least partially defining a fuel filler compartment, with a tube receiving opening extending from the first surface to the second surface and a vent opening extending from the first surface to the second surface;
a fuel filler tube having an outer surface, an inner surface, a fuel receiving end, and a fuel tank attachment end opposite the fuel receiving end, the fuel receiving end defining a filler opening, the inner surface defining a fuel passageway extending from the fuel receiving end to the fuel tank attachment end, the fuel receiving end extending through the tube receiving opening and being attached to the cap protector at the tube receiving opening, the filler opening being located within the fuel filler compartment, the fuel receiving end of the fuel filler tube includes an annular flange that is flared radially outwardly relative to the filler opening and extending over the vent opening of the cap protector;
an air vent chamber structure having a first wall and a second wall, the first wall having a first end and a second end, the first end being located at the second surface of the cap protector, the first wall at least partially surrounding the outer surface of the fuel filler tube proximate the fuel receiving end, the second wall extending from the second end of the first wall toward the outer surface of the fuel filler tube, the first wall, the second wall, the outer surface of the fuel filler tube, and the second surface of the cap protector defining an air vent chamber being in fluid communication with the fuel filler compartment via the vent opening of the cap protector.

14. The fuel filler tube assembly according to claim 13, wherein
the annular flange is dimensioned to conceal the vent opening as viewed along a central axis of the filler opening.

15. The fuel filler tube assembly according to claim 13, wherein
the vent opening of the cap protector comprises a plurality of vent openings in fluid communication with the air vent chamber, each of the plurality of vent openings being spaced apart from one another circumferentially around the tube receiving opening.

16. The fuel filler tube assembly according to claim 13, wherein
the vent opening of the cap protector comprises a plurality of vent openings in fluid communication with the air vent chamber, each of the plurality of vent openings being spaced apart radially from the tube receiving opening.

17. The fuel filler tube assembly according to claim 13, wherein
the first wall of the air vent chamber structure defines a chamber opening in fluid communication with the air vent chamber.

18. The fuel filler tube assembly according to claim 13, wherein
the first wall of the air vent chamber structure completely encircles the outer surface of the fuel filler tube adjacent to the cap protector.

\* \* \* \* \*